United States Patent [19]

Brinkmann et al.

[11] 3,791,869
[45] Feb. 12, 1974

[54] STORAGE BATTERY ELECTRODE

[75] Inventors: Jürgen Brinkmann, Berenbostel; Manfred Rasche, Hagen; Willi Heissmann, Nachrodt, all of Germany

[73] Assignee: Varta Aktiengesellschaft, Frankfurt/Main, Germany

[22] Filed: June 26, 1972

[21] Appl. No.: 266,162

[30] Foreign Application Priority Data
July 1, 1971 Germany.............................. 2132690

[52] U.S. Cl. ............................. 136/81, 136/134 R
[51] Int. Cl. ......................................... H01m 35/32
[58] Field of Search.. 136/79, 80, 134, 81; 204/286, 204/297 R

[56] References Cited
UNITED STATES PATENTS

| 577,771 | 2/1897 | Morris | 136/80 |
| 2,210,772 | 8/1940 | Navarin | 136/134 R |

FOREIGN PATENTS OR APPLICATIONS

| 112,113 | 8/1899 | Germany |
| 338,620 | 10/1903 | France |

Primary Examiner—Donald L. Walton
Attorney, Agent, or Firm—Gerard J. Weiser

[57] ABSTRACT

The plate electrodes of storage batteries having large vertical dimensions are made up of two or more vertically spaced plate segments. Connectors are provided which link these segments mechanically together, and which connect them electrically in parallel.

19 Claims, 9 Drawing Figures

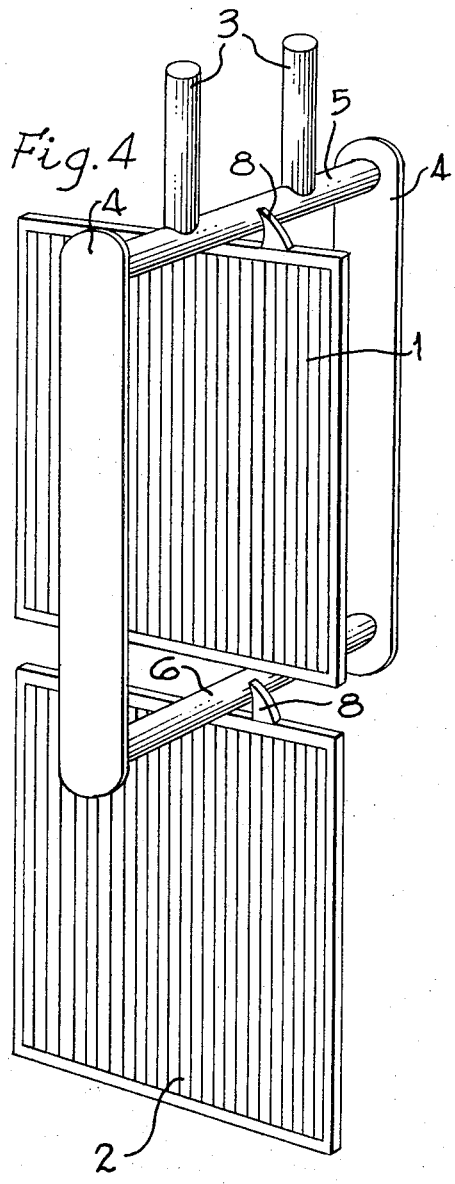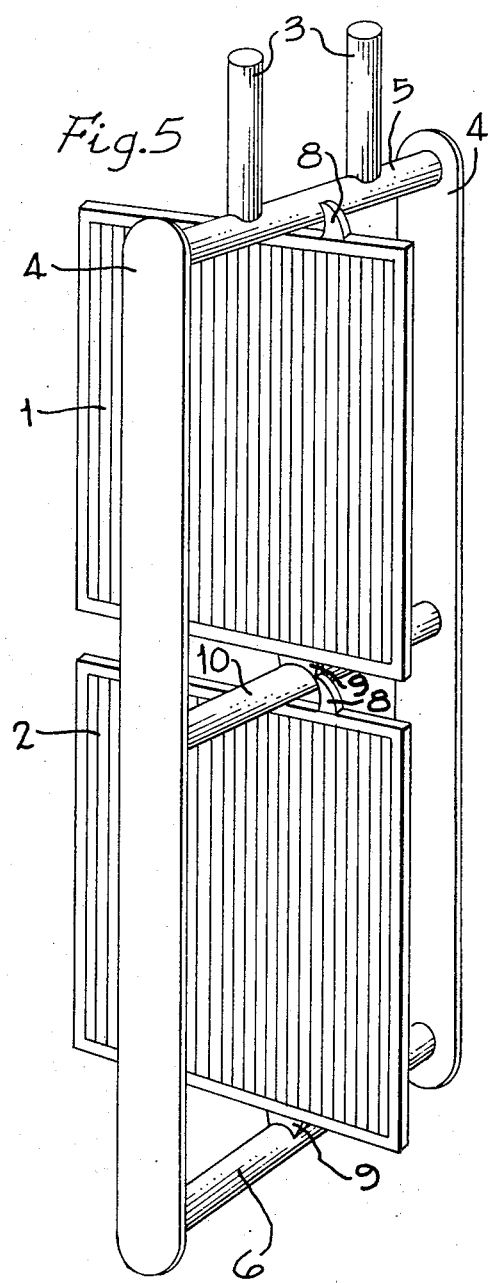

PATENTED FEB 12 1974  3,791,869

STORAGE BATTERY ELECTRODE

The invention relates to electrodes for storage batteries, and particularly for lead storage batteries of large vertical dimensions.

The grid plates of lead electrodes are conventionally made in one piece, even when dealing with very tall cells whose heights may range from 1,000 to 1,400 millimeters. Very tall steel electrodes, on the other hand, are made of a plurality of plate segments, disposed vertically above each other, U-shaped metal strips being used to connect adjacent ones in sequence but without any spacing between them.

Both of these forms of electrode construction have the same disadvantages. If high current is drawn from a cell of such tall configuration, currents of different intensities flow in the plate connectors. Specifically the current increases linearly, from the base of the plates upwardly toward the topmost connector, whereas the voltage drop in the connectors increases as a quadratic function. During current drain from a storage battery, the voltage drops developed in the connectors for the negative plates, as well as those developed in the connectors for the positive plates subtract from the potential difference between the two plates, thereby lowering the terminal voltage of the cell. Moreover, this big voltage drop produces appreciable losses in the connectors. With lead plates, particularly, these losses lead to rapid heating due to the low thermal capacity of lead. This causes the resistance to increase further and the losses to increase likewise. Given a current flow in the lead plate connectors, which increases linearly from bottom to top, and assuming that the connectors have uniform cross-sections, power losses in the lead connectors will vary as a quadratic function of the current, from bottom to top. Therefore, the upper portion of the cell heats up strongly, while the temperature of the lower portion scarcely changes.

This leads to a further disadvantage of prior forms of electrode construction, which is that no natural electrolyte circulation tends to take place, and therefore the high thermal capacity of the electrolyte within the cell is only slightly used for heat dissipation. As a result, the temperature in the upper portion of the cell reaches its permissible limits before the cell has been adequately discharged.

A further disadvantage attributable to the voltage drop in the connectors is that differing potentials arise between the individual elements of the positive and negative plates positioned opposite each other within the cell. Between a pair of elements in the upper part of the cell the potential is low, whereas between a pair of elements in the lower portion it is high. These differences in the potential between plate elements leads to differences in current density on the surface of the plates. At the beginning of the discharge process, this density is higher in the upper portion of the cell than in the lower portion. Since the peak current drain capacity of storage batteries generally drops rapidly with increasing current, this variation in current density on the plate surfaces lessens the battery storage capacity.

Accordingly, it is an object of the invention to alleviate the disadvantages set forth above.

It is another object to provide an electrode having more uniform current density distribution, better voltage output and great utilization of storage capacity.

These objects, and others which will appear, are achieved by a construction in which each electrode is formed of a plurality of plate segments, spaced from each other and disposed vertically above one another, and provided with current connectors which link them mechanically together and which connect them electrically in parallel.

For further details, reference may be had to the description which follows, in the light of the accompanying drawings, wherein FIGS. 1 and 2 illustrate diagramatically the basic concept of the invention; and FIGS. 3 through 9 show various specific embodiments thereof.

The same reference numerals are used in the various figures to designate similar elements.

FIGS. 1 and 2, to which reference may now be had, show in perspective and elevation, respectively, two adjacent storage battery plates embodying the invention. These may be the positive and negative plates, respectively. Each such battery plate consists of a plurality of segments. Two such segments 1 and 2, are shown in FIGS. 1 and 2, but it will be understood that greater numbers of segments may be used. The segments 1 and 2 are disposed directly above one another, but spaced from each other in the vertical direction.

Mechanical and electrical connection takes place by means of connector 4. This connector is coupled both to the current take-off lug of the lower plate segment 2, and to the terminal posts 3 associated with the header for plate segment 1. Thus, the two separate plate segments 1 and 2 are connected electrically in parallel.

Experiments have shown that the arrangements described above, with the plate segments positioned vertically above each other and connected in parallel, yield a marked improvement in voltage characteristics and a considerable increase in battery power capacity.

In further elaboration of the inventive concept, electrodes embodying the invention utilize two or more plate segments of equal dimensions, connected together. This brings about simplification in the process used to manufacture the electrode grids, as well as in the pasting of the negative plates, and in the introduction of active mass into the tubes which may constitute the positive plates. Since the plate segments are inherently smaller than the large plates previously utilized, they are easier to handle and their mechanical attachment can be made simpler and less heavy.

FIG. 3, to which reference may now be had, shows a specific form of plate hanger employing the vertical side rails 4, connecting straps 5 and 6 connecting these rails, and terminal posts 3. FIG. 4 shows the upper electrode plate segment 1 welded to the upper connecting strap 5, while the lower plate segment 2 is welded to the lower strap 6.

FIGS. 5, 6 and 7, to which reference may now be had, show a double plate hanger with three connecting straps 5, 6 and 10 for mounting the individual plate segments.

FIG. 5 shows the upper plate segment 1 with its current take-off lug 8 welded to the upper connecting strap 5 and with its plate rest welded to the middle connecting strap 10. Lower plate segment 2 has its current take-off lug 8 welded to the middle connecting strap 10 and its plate rest 9 to the lower connecting strap 6. This arrangement is especially useful when the cell is to be used at high power levels.

FIG. 6 shows three plate segments connected to the same double plate hanger. Plate segment 1 has its current take-off lug 8 welded to the upper connecting strap 5, the next lower plate segment 11 has its current take-off lug 8 welded to the middle connecting strap 10, and the lowest plate segment 2 has its current take-off lug 8 welded to the lower connecting strap 6. Again, all plates are connected electrically in parallel through the plate hanger structure.

In FIG. 7, to which reference may now be had, there are shown four separate plate segments 1, 2, 12 and 13, mounted in the same kind of double hanger as shown in FIG. 6. In this arrangement, the upper plate elements 1 and 2 within each hanger section are attached to the upper connecting strap of the section, while the lower elements 12 and 13 within each hanger section are attached to the lower connecting strap of that respective section.

Figure 1:
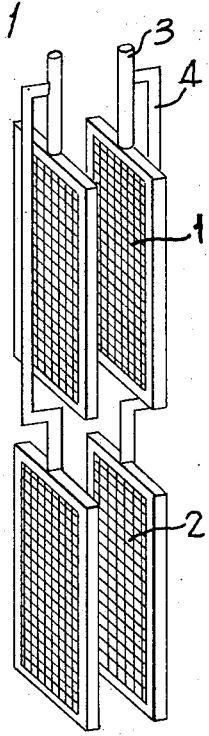
Figure 2:
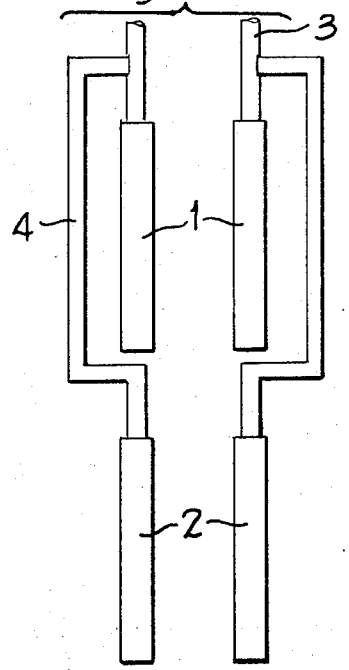
Figure 3:
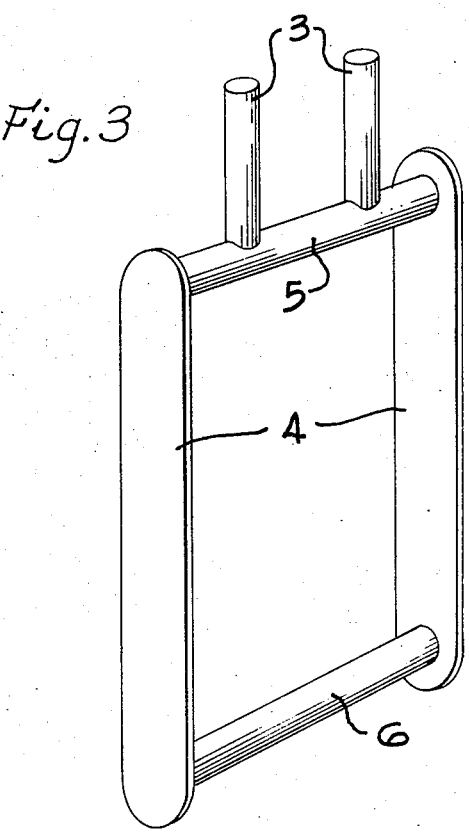
Figure 6:
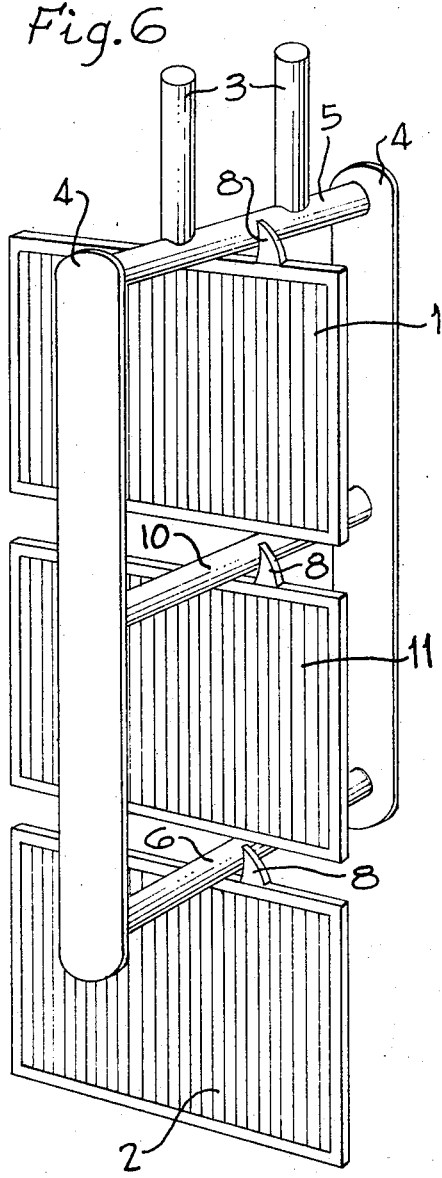
Figure 7:
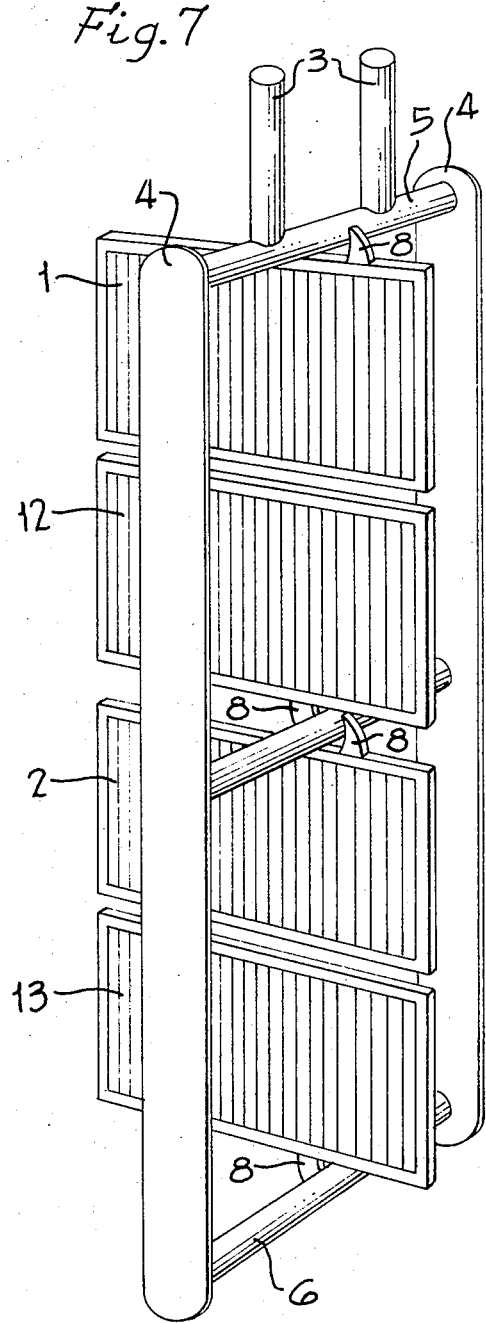
Figure 8:
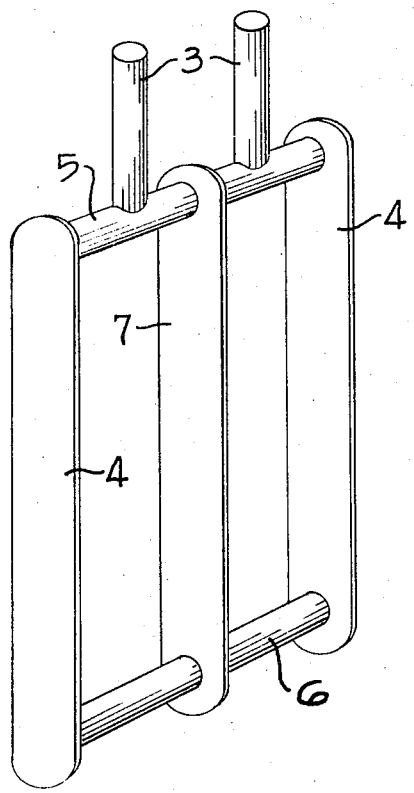
FIG. 8 shows a modification of the hanger employing an additional vertical strap 7 whose presence substantially augments the current carrying capacity of the hanger arrangement.
Figure 9:
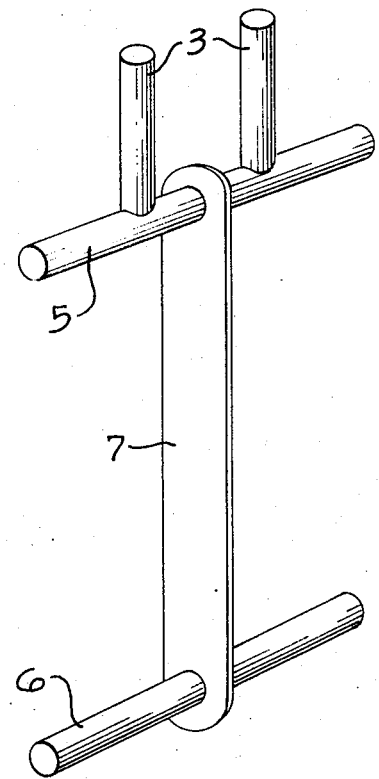
FIG. 9 shows still another modification of the plate hanger in which the strap 7 of FIG. 8 has been retained, while the side straps 4 are omitted. The hanger is therefore in the form of a T or rather a double T.

We claim:

1. Plate electrode means for storage batteries comprising a plurality of plate segments spaced from each other and positioned vertically above one another, and current connector means which mechanically link said elements and connect them electrically in parallel.

2. The electrode means of claim 1 wherein all of said plate segments are of substantially equal dimensions.

3. Electrode means according to claim 1 wherein the current connector means is a plate hanger frame.

4. Electrode means according to claim 1 wherein the connector means is in the form of multiple hanger frames.

5. Electrode means according to claim 1 characterized in that the current connector means is a T-shaped plate hanger.

6. Electrode means according to claim 4 wherein the connector means is in the form of a double T.

7. Electrode means according to claim 3 wherein a plurality of electrode segments are positioned between adjacent connecting straps of the hanger frame.

8. Electrode means according to claim 3 wherein one of said plate segments is attached at its top to the lower connecting strap of said hanger frame and another plate segment is attached at its top to the upper connecting strap of said frame.

9. The cell of claim 1 wherein each plate segment has a rest, the rests of segments of the same polarity being supported on the respective subjacent connecting straps.

10. A lead storage cell comprising:
positive and negative plate electrodes, each respective electrode including a plurality of plate segments, spaced from each other and positioned vertically above one another.
a separate set of vertically spaced connecting straps for each plate electrode, the plate segments of a given polarity being all linked mechanically and electrically to the connecting straps of their respective set, and
connectors for mechanically linking and electrically paralleling the vertically spaced connecting straps of a given set.

11. The cell of claim 10 wherein all the plate segments of a given electrode are of substantially equal dimensions.

12. The cell of claim 10 wherein the connecting straps and connectors take the form of a plate hanger frame.

13. The cell of claim 10 wherein the connecting straps and connectors take the form of multiple hanger frames.

14. The cell of claim 10 wherein the connecting straps and connectors take the form of T's.

15. The cell of claim 10 wherein the connecting straps and connectors take the form of double t's.

16. The cell of claim 10 wherein each plate segment has a rest, the rests of segments of the same polarity being supported on the respective subjacent connecting straps.

17. The cell of claim 10 wherein each plate segment has a current take-off lug, the lugs of segments of the same polarity being attached to the respective adjacent connecting straps.

18. The cell of claim 10 wherein a plurality of plate elements of the same polarity are positioned between successive ones of said vertically spaced connecting straps.

19. The cell of claim 10 wherein one of said plate elements is attached at its top to the lowermost of said connecting straps.

* * * * *